May 10, 1938.　　　　D. A. MEEKER　　　　2,116,764
FOOD HANDLING APPARATUS
Filed July 30, 1934　　　3 Sheets-Sheet 1

INVENTOR
David A. Meeker
BY Marechal & Noe
ATTORNEYS

May 10, 1938. D. A. MEEKER 2,116,764
FOOD HANDLING APPARATUS
Filed July 30, 1934 3 Sheets-Sheet 2

INVENTOR
David A. Meeker
BY Marechal & Noe
ATTORNEYS

Patented May 10, 1938

2,116,764

UNITED STATES PATENT OFFICE 2,116,764

FOOD HANDLING APPARATUS

David A. Meeker, Troy, Ohio, assignor to The Hobart Manufacturing Company, Troy, Ohio, a corporation of Ohio Application July 30, 1934, Serial No. 737,541

12 Claims. (Cl. 261—93)

This invention relates to food handling apparatus and more particularly to an apparatus for aerating foods and other liquids.

It is the principal object of this invention to provide an apparatus for introducing air in finely divided streams of bubbles into a liquid simultaneously with stirring of the liquid.

It is a further object to provide a simple and effective apparatus for introducing air into a body of liquid to aerate the same uniformly and completely.

It is a further object to provide apparatus for aerating a liquid in which self-contained air pressure means is positioned above the liquid level and the air under pressure is distributed into the liquid adjacent the bottom thereof.

It is a further object to provide as an attachment for a mixing machine, an aerating apparatus adapted to introduce air in finely divided streams of bubbles into the body of liquid.

Other objects and advantages will be apparent from the description, the accompanying drawings, and the appended claims.

In the drawings,—

Figure 1:
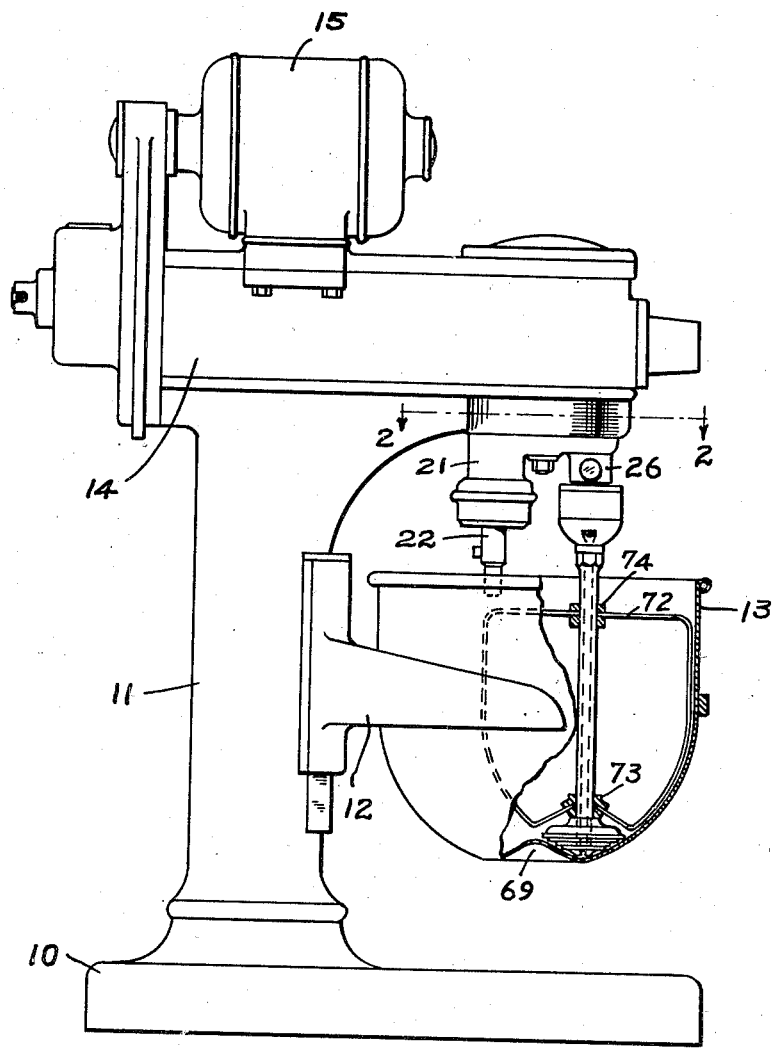
Fig. 1 represents an elevational view of a device constructed in accordance with the present invention, certain parts being broken away to more clearly show the construction.
Figure 2:
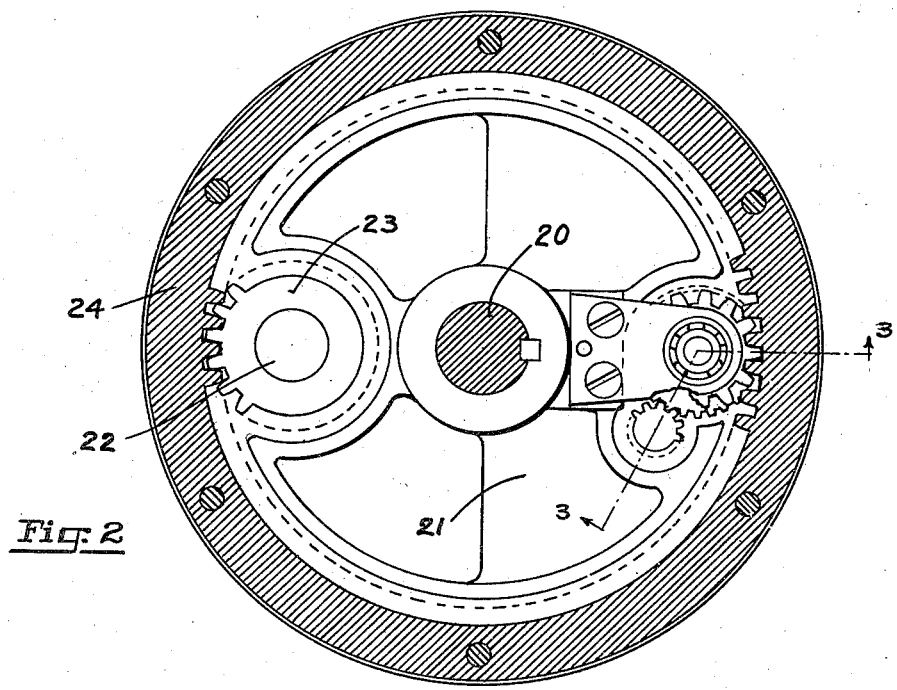
Fig. 2 is a horizontal sectional view on the line 2—2 of Fig. 1.
Figures 3, 4, 5:
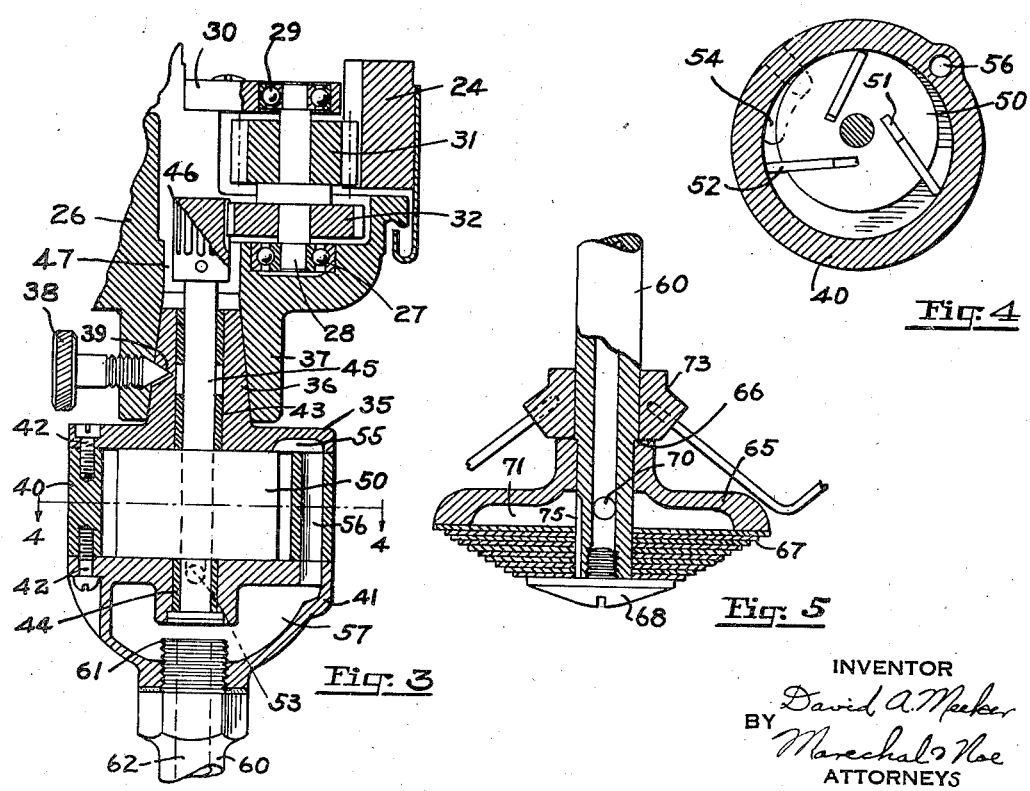
Fig. 3 is a vertical sectional view on the line 3—3 of Fig. 2.
Fig. 4 is a horizontal sectional view on the line 4—4 of Fig. 3.
Fig. 5 is a vertical sectional view showing the air distributing means of this invention.

Referring to the drawings which disclose preferred embodiments of the invention, there is shown a food handling apparatus of standard construction such, for example, as that shown in Johnston Patent 1,878,149 assigned to the same assignee as this application. The device comprises generally a base 10, supporting a pedestal 11, which holds the bowl supporting frame 12 in which is mounted the mixing bowl 13. On top of the pedestal is positioned the transmission gearing housing 14, the driving motor 15 being mounted on the housing. The motor is adapted to drive the shaft 20, the transmission preferably including suitable change speed gearing such, for example, as shown in said Johnston patent, to provide for the operation of the driven elements at a selected speed.

The driven shaft 20 is keyed to the planetary head 21. The head rotatably supports beater shaft 22 upon which is mounted a pinion 23 meshing with a stationary ring gear 24. This construction provides for a planetary motion of the beater shaft 22 in the bowl in the customary manner. No attachment connections for the beater shaft have been shown, but it will be understood that a suitable attachment may be readily attached to the shaft to accomplish the usual mixing and stirring operations within the bowl 13.

The planetary head is provided with a housing member 26 having a recess in which there is positioned an antifriction bearing 27 for journalling a shaft 28. The upper end of this shaft is journalled in antifriction bearing member 29 positioned in a supporting arm 30 which is removably mounted on the head. Mounted upon the shaft 28 and in engagement with ring gear 24 is a pinion 31 adapted to be rotated upon its axis as the planetary head revolves. Also attached to shaft 28 and below ring gear 24 is a pinion 32, somewhat larger in diameter than pinion 31.

A pump unit 35 is adapted to be removably supported in position upon the housing member 26. For this purpose the pump unit casing is formed with an upwardly tapering neck 36 which is adapted to be received within a cooperatively tapered socket in a depending extension of the housing 26. Thumb screw 38 mounted within the extension 37 and cooperating with a notch 39 in the neck 36 serves to securely hold the pump unit in proper operative position, while providing for ready removal therefrom as desired.

The pump unit comprises the upper casing section 36, the pump cylinder 40, and a lower casing section 41, these parts being detachably connected by means of bolts 42. Bearing members 43 and 44 formed respectively in the upper and lower casing sections provide for journalling a shaft 45. This shaft at its upper end carries a pinion 46 which meshes in driving engagement with the pinion 32, extending through a suitably formed opening 47 in the housing 26. This provides for the separation of the entire pump unit and its drive shaft from the housing 26 when desired, the pinion 46 being withdrawn from engagement with pinion 32 through the opening 47 upon release of thumb screw 38.

Fixed to shaft 45 eccentrically of pump cylinder 40 is a cylindrical rotor 50. The rotor is formed with a plurality of grooves 51 within which are slidably mounted vanes 52, centrifugal force or suitable means providing for yieldingly urging the vanes into contact with the inner wall of the cylinder 40, a suitable lubricant and fluid sealing medium also being provided. The lower casing section 41 is formed with air inlet 53 and an arcuate depression 54 is formed in the horizontal face of the lower casing to provide for the supply of air to the pump. The outlet of the pump on the pressure side is shown at 55, and a passage 56 is formed in the cylinder wall 40 to provide for the discharge of the air into a pressure chamber 57 formed in the lower housing member 41. As will be readily understood, the parts just described comprise an air pump which upon rotation of shaft 45 supplies air under pressure to the air reservoir 57.

A tube 60 is threadedly received within the lower housing member 41 in fluid tight relation, the upper end 61 thereof preferably extending somewhat above the bottom of the air chamber to prevent any possibility of moisture or lubricant passing down the central passageway 62 of the tube. This tube serves as an air supply passage and also as a support for the air distributing means.

Such air distributing means is positioned adjacent the lower end of tube 60, in such position that with the bowl 13 in the normal raised position, the air distributing means extends substantially to the bottom of the bowl, providing for the discharge of air into the body of liquid adjacent the bottom thereof. The air distributing means preferably comprises a plate 65 fitting over the lower end of tube 60, and abutting against a shoulder 66 thereon. A plurality of disks 67 are arranged coaxially with the end disk in contact with plate 65. The disks and plate 65 are removably held in fixed position by a screw 68 which is threadedly received within the end of tube 60. Preferably the plates are formed of progressively increasing diameter upwardly as shown such as to closely correspond with the bottom of the bowl, the bowl preferably having a central raised portion 69 to prevent accumulation of untreated material at the center thereof.

The disks 67 are formed with a series of fine etched grooves on their contacting surfaces such that when the plates are in contact with each other, the grooves form a series of channels leading from the tube 60 to the periphery and adapted to distribute the air into the liquid in fine streams of predetermined size. The tube 60 is formed with an opening 70 leading into an air chamber 71 formed between the plate 65 and the disks 67, and air is supplied between each pair of disks along an opening 75 which is formed as a slot in the tube 60. In this way air from the pump, positioned above the liquid level, is supplied downwardly into the air distributing means and distributed in said controlled streams into the liquid. The air distributing means may be readily removed by removing screw 68 and the plates separated for cleaning purposes as desired.

The tube 60 is also preferably provided with a stirring frame 72 fixed in supporting members 73 and 74 which are loosely mounted on tube 60, such stirring frame being preferably bent so as to closely conform to the inner wall of the bowl. The frame is freely rotatable on tube 60 and is adapted to revolve as a result of reaction on the work material in response to movement of tube 60 in the bowl, producing a thorough and uniform stirring of the work material. The tube 60, while not rotated on its own axis, is carried around in the bowl by the planetary head.

In the operation of the device the bowl is filled with a suitable quantity of the liquid to be aerated, such for instance as cream to be whipped, and the bowl is then raised on its supporting frame 12 to the operative position shown in Fig. 1. The motor drives through its gear train and causes rotation of the planetary mechanism as above described. This in turn causes operation of the air pump, air being supplied through tube 60 to the air distributing means which is simultaneously moved throughout the bowl adjacent the bottom thereof, thereby making the air distributing means effective with respect to the entire body of liquid.

It is found that as the air distributing means is moved through the liquid and air in predetermined fine streams introduced thereinto, such motion tends to break off the individual bubbles shortly after they are formed, and consequently results in the production of bubbles of small and controlled size. The movement of the air distributing means during the supplying of air therefore effects control of the bubble size in addition to that resulting from the characteristics of the air distributing means. During the aerating operation, the stirring frame 72 is effective to stir the contents of the bowl, and serves to prevent the formation of large fissures and the like and to maintain a uniform and complete aerating operation.

When it is desired to use merely the usual mixing or other attachments, the bowl 13 is lowered and the entire pump unit 35 is separated from the planetary housing member 26 in the manner above described, and removed from the bowl. Thereafter any desired attachment can be connected with the planetary shaft 22 and the device operated in the customary manner.

Figures 6, 7:
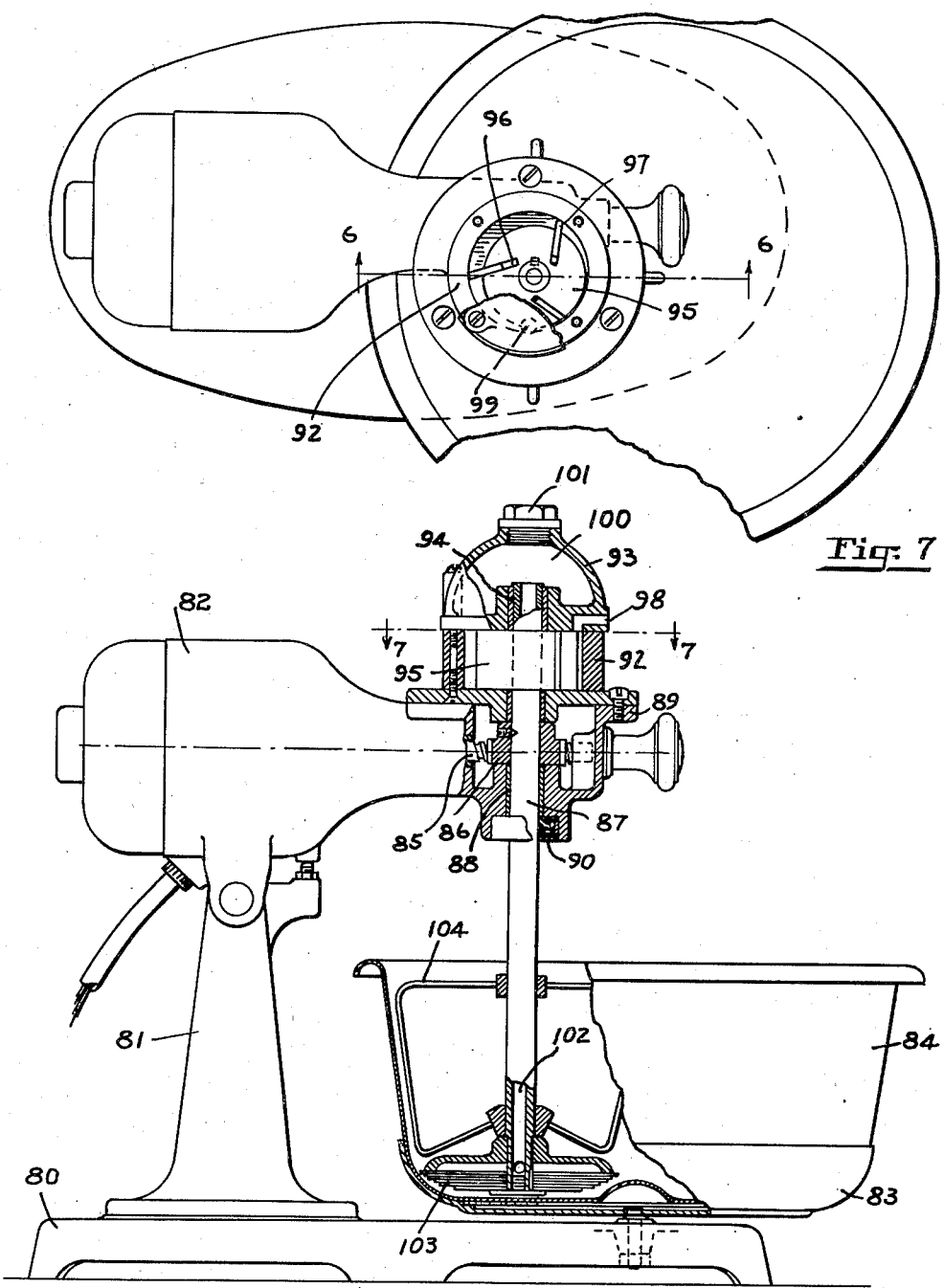
Fig. 6 is a view partially in elevation and partially in section of a modified device according to the present invention, the portion in section being taken along the line 6—6 of Fig. 7.
Fig. 7 is a horizontal sectional view on the line 7—7 of Fig. 6.

A somewhat modified construction is shown in Figs. 6 and 7. In this modification there is shown a base 80 supporting a pedestal 81 upon which is pivotally mounted a motor driving unit 82. The base also provides a rotatable support for a turn-table 83 upon which is positioned a foodstuffs receiving bowl 84.

The drive shaft of the drive unit 82 is adapted to overhang the bowl 84 in operative position and at its forward end is formed with a worm 85 forming part of the power transmission means. A worm gear 86 meshing with worm 85 is fixed to a vertical tubular shaft 87 which is journalled upon bearing member 88 in a housing section 89. Suitable sealing means 90 positioned on the shaft 87 serves to prevent leakage of lubricant down into the material within the bowl.

A pump unit including a pump cylinder 92 and an upper casing section 93 is fastened to the housing 89, the upper casing section 93 being formed with an upper bearing 94 for shaft 87. Mounter upon the shaft 87 is a pump rotor 95 positioned eccentrically of the casing 92 to serve as an air pump. The disk 95 is provided with a plurality of slots 96 within which are slidably positioned the vanes 97, yieldable means (not shown) being provided for urging said vanes into contact with the wall of cylinder 92. An air inlet 98 is formed in the upper casing section 93, and a pressure outlet 99 on the discharge side of the pump communicates with an air reservoir 100 formed within casing section 93. The reservoir is closed by the removable cap member 101.

The tube 87 is provided with internal passage 102 in communication with the air reservoir, and extending down into the bowl 84 such that the tube serves as an air supply conduit. Air distributing means 103 is positioned at the lower end of tube 87, this means being preferably of the same construction as described above, being made to conform to the bottom of the bowl to distribute the air uniformly into the liquid. The tube is also provided with a stirring frame 104 free or fixedly mounted thereon and adapted to be rotated in the bowl during operation of the device.

In the operation of this modified form of construction, operation of the drive unit causes rotation of tube 87 with consequent operation of the air pump and rotation of the air distributing means and the stirring means within the bowl 84. The reaction on the bowl caused by this motion results in rotation of the bowl on its own axis so that the air distributing means is effective with respect to the entire body of the liquid. The pump supplies air under pressure to the air distributing means from which it is distributed in predetermined fine streams into the liquid. The motion of the air distribution means during the aeration effects the above described limiting and controlling effect upon the formation of the bubbles, and consequently producing an aeration of the character desired.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. Apparatus of the character described for aerating liquid foodstuffs comprising a motor, a bowl for receiving a liquid, an air pump driven by said motor, air distributing means including a plurality of members in surface to surface contact and formed with fine grooves on the surface thereof adapted to introduce air forced therethrough into the liquid in minute streams of finely divided bubbles, means for supporting said air distributing means providing for uniform controlled movement of said air distributing means with respect to the entire contents of said bowl, and means for supplying air from said air pump to said air distributing means.

2. Apparatus of the character described which comprises a motor unit, a bowl for holding a quantity of liquid, an air pump driven by said motor unit positioned above said bowl, a tube coaxial with the pump and extending down into the bowl, air distributing means comprising a plurality of members in surface to surface contact and formed with fine grooves on the surface thereof adapted to introduce air forced therethrough into the liquid in minute streams of finely divided bubbles, said air distributing means being mounted on the lower side of said tube within the bowl, and means for supplying air from said air pump to said tube to be distributed into the liquid in said bowl in fine streams.

3. Apparatus of the character described comprising a bowl for holding a quantity of liquid, a motor, a tubular shaft driven by said motor, an air pump mounted on said tubular shaft and adapted to be operated by the rotation of said shaft to supply air under pressure, air distributing means in communication with said air pump carried by the lower end of said tubular shaft and extending into said bowl, said air distributing means comprising a plurality of members in surface to surface contact and formed with fine grooves on the surface thereof adapted to introduce air forced therethrough into the liquid in minute streams of finely divided bubbles, said tubular shaft providing for the rotation of said air distributing means in said bowl, and also providing for simultaneous supplying of air thereto.

4. Apparatus of the character described for introducing air into a body of liquid in minute streams of finely divided bubbles which comprises a power drive unit, a shaft driven by said unit and supported thereby in overhanging relationship, a planetary head rotatably carried by said shaft, a driven shaft rotatably mounted in said planetary head, said driven shaft carrying a pinion, a stationary internal gear having meshing engagement with said pinion to produce planetary movement thereof upon rotation of said drive shaft, an air pump removably attached to said planetary head for rotation therewith, detachable driving connections between said pinion and said pump providing for the driving of said pump upon rotation of said pinion, a tubular shaft attached to said pump and extending down into the body of liquid to be aerated, and air distributing means supported adjacent the bottom of said container by said tubular member, and adapted for rotation in the body of liquid, said air pump having communication with the air distributing means through said tubular member to supply air to said distributing member.

5. An attachment of the character described for a mixing device having a planetary head, comprising a bowl for receiving a material to be aerated, an air pump unit including an air pump, means for removably attaching said air pump unit to said planetary head, detachable means for driving said air pump from said planetary head when in assembled position thereon, and air introducing means carried by said unit in communication with said air pump and extending into the material within said bowl for introducing air thereinto.

6. Apparatus of the character described for aerating liquid foodstuffs and the like comprising a power source, a bowl for receiving a liquid to be aerated, a rotary head driven from said power source, a pump unit attached to said head, said unit including an air pump, means for rotating said air pump with respect to said head in response to rotation of said head, and air distributing means attached to and carried by said head and rotatable therewith for distributing air from said air pump to the liquid in said bowl in finely divided streams.

7. Apparatus of the character described for aerating liquid foodstuffs and the like comprising a power source, a bowl for receiving a liquid to be aerated, a rotary head driven from said power source, a pump unit attached to said head, said unit including an air pump, means for rotating said air pump with respect to said head in response to rotation of said head, air distributing means attached to and carried by said head and rotatable therewith for distributing air from said air pump to the liquid in said bowl in finely divided streams, and a stirring frame freely rotatably mounted on said air distributing means.

8. Apparatus of the character described comprising a stationary frame, a motor, a rotary head driven from said motor and supported in said frame, an air pump having a casing carried by and rotatable with said head, means cooperating with said frame for effecting operation of said air pump in response to rotation of its said casing, an air distributing means fixedly attached to said casing and adapted to be rotated therewith, and means forming an air conduit connecting said air pump with said air distributing means.

9. A cream whipping apparatus of the character described which comprises a bowl for receiving liquid cream, means for mounting the bowl for free rotation, a source of air pressure, an air distributing means in communication with said source of air pressure for introducing the air into the liquid cream in a plurality of minute streams of finely divided bubbles to produce whipping of the cream immediately adjacent thereto, means for effecting rotation of said air distributing means, said rotation of the air distributing means effecting rotation of the bowl by reaction on the cream therein, and the resultant bringing of the entire liquid contents of the bowl into whipping relation with said air distributing means for complete whipping thereby.

10. Apparatus of the character described which comprises a base, a pedestal thereon, a motor supported on the pedestal, a casing supported on said pedestal and extending in overhanging relation to the base, an air pump supported on said overhanging casing and having a central tubular drive shaft driven from said motor, a bowl for holding a quantity of work material, means for mounting said bowl for free rotation, air distributing means mounted on said drive shaft and having communication therethrough with said air pump, said air distributing means being rotated with said drive shaft to effect rotation of said bowl by reaction on the work material therein.

11. Apparatus of the character described comprising a base, a pedestal, a power unit pivotally mounted on said pedestal, a tubular shaft rotatably mounted on said power unit, an air pump supported on said unit and having a rotary part mounted on said shaft, and air distributing means carried by said shaft in operative position in said bowl, said shaft also providing for supplying air from said air pump to said air distributing means.

12. Apparatus of the character described comprising a stationary frame, a motor, a rotary head driven from said motor and supported in said frame, an air pump having a casing carried by and rotatable with said head, means cooperating with said frame for effecting operation of said air pump in response to rotation of its said casing, an air distributing means fixedly attached to said casing and adapted to be rotated therewith, means forming an air conduit connecting said air pump with said air distributing means, and a stirring frame freely rotatably mounted on said air conduit.

DAVID A. MEEKER.